(12) United States Patent
Good et al.

(10) Patent No.: US 10,974,810 B2
(45) Date of Patent: *Apr. 13, 2021

(54) CONTROLLING AIRLOADS ON AIRCRAFT FOLDING WING TIPS

(71) Applicant: The Boeing Company, Chicago, IL (US)

(72) Inventors: Mark Steven Good, Seattle, WA (US); Jonathan J. Paul, Everett, WA (US)

(73) Assignee: The Boeing Company, Chicago, IL (US)

( * ) Notice: Subject to any disclaimer, the term of this patent is extended or adjusted under 35 U.S.C. 154(b) by 617 days.

This patent is subject to a terminal disclaimer.

(21) Appl. No.: 15/842,413

(22) Filed: Dec. 14, 2017

(65) Prior Publication Data

US 2018/0105256 A1 Apr. 19, 2018

Related U.S. Application Data

(63) Continuation of application No. 14/988,202, filed on Jan. 5, 2016, now Pat. No. 9,873,502.

(51) Int. Cl.
*B64C 3/56* (2006.01)
*B64C 9/24* (2006.01)
*B64C 9/00* (2006.01)

(52) U.S. Cl.
CPC .............. *B64C 3/56* (2013.01); *B64C 9/24* (2013.01); *B64C 2009/005* (2013.01); *Y02T 50/10* (2013.01)

(58) Field of Classification Search
CPC ....... B64C 3/56; B64C 9/24; B64C 2009/005; B64C 29/0033; B64C 23/072; B64C 39/068; B64C 11/28
See application file for complete search history.

(56) References Cited

U.S. PATENT DOCUMENTS

| 5,201,479 A * | 4/1993 | Renzelmann | B64C 3/56 244/49 |
| 5,381,986 A * | 1/1995 | Smith | B64C 3/56 244/49 |

(Continued)

FOREIGN PATENT DOCUMENTS

| CN | 103786871 | 5/2014 |
| EP | 2727829 | 5/2014 |

(Continued)

OTHER PUBLICATIONS

Canadian Intellectual Property Office, "Office Action", issued in connection with application No. 2,946,498 dated Sep. 25, 2019, 4 pages.

(Continued)

*Primary Examiner* — Hunter B Lonsberry
*Assistant Examiner* — Luis A Martinez Borrero
(74) *Attorney, Agent, or Firm* — Hanley, Flight & Zimmerman, LLC

(57) ABSTRACT

Example apparatus and methods are disclosed herein for moving control surfaces on an aircraft wing to control airloads during a wing tip folding operation (from a folded position to an extended position or from an extended position to a folded position). An example method includes determining a position of a control surface on a wing of an aircraft. In the example method, the wing has a fixed wing portion and a wing tip moveably coupled to the fixed wing portion. The example method includes determining a change in the position of the control surface from a first position to second position for facilitating movement of the wing tip while the aircraft is not in flight. The example method also includes moving the control surface to the second position and moving the wing tip between an extended position and a folded position.

20 Claims, 7 Drawing Sheets

(56) References Cited

U.S. PATENT DOCUMENTS

| | | | | |
|---|---|---|---|---|
| 5,427,329 A * | 6/1995 | Renzelmann | ............ | B64C 3/56 |
| | | | | 244/49 |
| 7,275,722 B2 * | 10/2007 | Irving | ................. | B64C 23/072 |
| | | | | 244/201 |
| 8,788,122 B1 * | 7/2014 | Sankrithi | ............ | G05D 1/0066 |
| | | | | 701/3 |
| 9,010,693 B1 * | 4/2015 | Barbieri | .................... | B64C 3/54 |
| | | | | 244/218 |
| 9,162,755 B2 * | 10/2015 | Guida | ................... | B64C 23/069 |
| 9,290,260 B2 * | 3/2016 | Lassen | .................... | B64C 3/56 |
| 9,296,469 B2 * | 3/2016 | Santini | ...................... | B64C 3/56 |
| 9,296,472 B2 * | 3/2016 | Thoreen | ................. | B64C 13/04 |
| 9,469,392 B2 * | 10/2016 | Fox | ....................... | B64C 23/072 |
| 9,499,252 B2 * | 11/2016 | Lassen | ..................... | B64C 3/56 |
| 9,517,834 B2 * | 12/2016 | Thompson | ............... | B64C 3/56 |
| 9,868,517 B2 * | 1/2018 | McMahon | ............... | B64C 5/08 |
| 9,873,502 B2 * | 1/2018 | Good | ........................ | B64C 3/56 |
| 9,908,612 B2 * | 3/2018 | Fox | .......................... | B64C 3/56 |
| 9,919,809 B2 * | 3/2018 | Moy | .................... | G07C 5/0808 |
| 10,137,977 B2 * | 11/2018 | Thompson | ........... | B64C 23/072 |
| 10,196,128 B2 * | 2/2019 | Harding | ................. | B64C 13/28 |
| 10,301,007 B2 * | 5/2019 | Lassen | ..................... | B64C 3/56 |
| 10,370,083 B2 * | 8/2019 | Fox | ....................... | B64C 23/072 |
| 10,759,521 B2 * | 9/2020 | McMahon | ............... | B64C 3/38 |
| 2012/0187251 A1 * | 7/2012 | Guida | ................... | B64C 23/076 |
| | | | | 244/199.4 |
| 2013/0292508 A1 * | 11/2013 | Fox | .......................... | B64C 3/56 |
| | | | | 244/49 |
| 2014/0014768 A1 * | 1/2014 | Lassen | ..................... | B64C 3/56 |
| | | | | 244/49 |
| 2014/0061371 A1 * | 3/2014 | Good | ........................ | B64C 3/56 |
| | | | | 244/49 |
| 2014/0117150 A1 * | 5/2014 | Good | ........................ | B64C 3/56 |
| | | | | 244/49 |
| 2014/0291453 A1 | 10/2014 | Sankrithi et al. | | |
| 2014/0306067 A1 * | 10/2014 | Guida | ................... | B64C 23/076 |
| | | | | 244/199.4 |
| 2014/0319268 A1 * | 10/2014 | Lassen | ..................... | B64C 3/56 |
| | | | | 244/49 |
| 2015/0014478 A1 * | 1/2015 | Lassen | ..................... | B64C 3/56 |
| | | | | 244/49 |
| 2015/0108283 A1 | 4/2015 | Thoreen et al. | | |
| 2015/0210377 A1 * | 7/2015 | Good | ........................ | B64C 3/56 |
| | | | | 244/49 |
| 2015/0298793 A1 * | 10/2015 | Fox | .......................... | B64C 3/56 |
| | | | | 244/49 |
| 2016/0009378 A1 * | 1/2016 | Guida | ................... | B64C 23/076 |
| | | | | 244/199.4 |
| 2016/0090170 A1 * | 3/2016 | Thompson | ................ | B64C 3/56 |
| | | | | 701/3 |
| 2016/0176508 A1 * | 6/2016 | Fevergeon | ................ | B64C 9/16 |
| | | | | 244/217 |
| 2016/0207608 A1 | 7/2016 | Good et al. | | |
| 2016/0264232 A1 * | 9/2016 | Briancourt | ............ | B64C 23/072 |
| 2016/0280392 A1 * | 9/2016 | Thoreen | .................... | B64C 9/00 |
| 2016/0362171 A1 * | 12/2016 | Lassen | ..................... | B64C 3/56 |
| 2017/0137112 A1 * | 5/2017 | Winkelmann | ............ | B64C 3/56 |
| 2017/0190410 A1 * | 7/2017 | Good | ........................ | B64C 3/56 |
| 2017/0355442 A1 * | 12/2017 | Winkelmann | .......... | F16H 48/20 |
| 2017/0355443 A1 * | 12/2017 | Winkelmann | ............ | B64C 3/56 |
| 2019/0152624 A1 * | 5/2019 | Dege | ......................... | B64C 3/56 |
| 2019/0248468 A1 * | 8/2019 | Lorenz | ...................... | B64C 3/56 |
| 2019/0367154 A1 * | 12/2019 | Weder | ....................... | B64C 3/56 |
| 2020/0023938 A1 * | 1/2020 | Dege | ......................... | B64C 3/56 |

FOREIGN PATENT DOCUMENTS

| | | |
|---|---|---|
| EP | 2862797 | 4/2015 |
| EP | 2881322 | 6/2015 |
| GB | 2524828 | 10/2015 |
| JP | 2015155293 | 8/2015 |
| RU | 2013113631 | 10/2014 |

OTHER PUBLICATIONS

European Patent Office, "Communication Pursuant to Article 94(3) EPC", issued in connection with application No. 16 194 204.0 dated Dec. 10, 2019, 4 pages.

China National Intellectual Property Administration, "First Office Action", issued in connection with Chinese Patent Application No. 2017100035697 dated Apr. 20, 2020, translation included, 13 pages.

European Patent Office, "Extended European search report," issued in connection with European Patent Application No. 16194204.0, dated Apr. 18, 2017, 7 pages.

United States Patent and Trademark Office, "Notice of Allowance and Fee(s) Due," issued in connection with U.S. Appl. No. 14/988,202, dated Oct. 17, 2017, 13 pages.

United States Patent and Trademark Office, "Non-Final Office Action," issued in connection with U.S. Appl. No. 14/988,202, dated Mar. 28, 2017, 14 pages.

Patent Office of the Cooperation Council for the Arab States of the Gulf, "Examination Report" issued in connection with Application No. GC 2017-32725 dated Jun. 27, 2019, 4 pages.

Patent Office of the Cooperation Council for the Arab States of the Gulf, "Examination Report" issued in connection with Application No. GC 2017-32725 dated Mar. 5, 2019, 4 pages.

Federal Service for Intellectual Property, "Office Action", issued in connection with Russian Patent Application No. 2016139646111(063199) dated Feb. 14, 2020, translation included, 10 pages.

Brazilian Patent Office, "Preliminary Office Action", issued in connection with Brazilian Patent Application No. 102016026482-0 dated Jun. 27, 2020, 6 pages.

Japanese Patent Office, "Notice of Reasons for Rejection," issued in connection with Japanese Application No. 2016-247348, dated Nov. 10, 2020, 6 pages.

European Patent Office, "Communication Pursuant to Article 94(3) EPC," mailed in connection with European Patent Application No. 16194204.0, dated Dec. 9, 2020, 6 pages.

National Intellectual Property Administration, P.R. China, "Notification of the Second Office Action," issued in connection with Chinese Application No. 2017100035697, dated Jan. 13, 2021, 9 pages.

* cited by examiner

CONTROLLING AIRLOADS ON AIRCRAFT FOLDING WING TIPS

RELATED APPLICATION

This patent arises from a continuation of U.S. application Ser. No. 14/988,202, titled "Controlling Airloads on Aircraft Folding Wing Tips," filed Jan. 5, 2016, which is hereby incorporated by reference in its entirety.

FIELD OF THE DISCLOSURE

This disclosure relates generally to aircraft folding wing tips and, more particularly, to controlling airloads on aircraft folding wing tips.

BACKGROUND

Larger aircraft have longer wingspans, which tend to produce more efficient flight. However, taxiway spacing and gate locations for most airports do not provide adequate spacing to accommodate such large wingspans. Therefore, longer wingspan aircraft typically employ folding wing tips. After landing, the wing tips are folded (upwards, downwards, forward, aft or a combination thereof) to reduce the wingspan of the aircraft.

SUMMARY

An example method disclosed herein includes determining a position of a control surface on a wing of an aircraft. In the example method, the wing has a fixed wing portion and a wing tip moveably coupled to the fixed wing portion. The example method includes determining a change in the position of the control surface from a first position to a second position for facilitating movement of the wing tip while the aircraft is not in flight. The example method also includes moving the control surface to the second position and moving the wing tip between an extended position and a folded position.

An example apparatus disclosed herein includes a processor configured to determine whether a control surface on a wing of an aircraft can be moved from a non-advantageous position to an advantageous position based on a control law. In the example apparatus, the wing has a fixed wing portion and wing tip moveably coupled to the fixed wing portion. The processor of the example apparatus is further to generate an instruction to move the control surface to the advantageous position based on whether the control surface can be moved. The example apparatus also includes a first controller to be communicatively coupled to a first actuator, which is coupled to the control surface. The first controller is to generate a control signal, in response to the instruction, to move the control surface from the non-advantageous position to the advantageous position. The example apparatus further includes a second actuator controller to be communicatively coupled to a second actuator to move the wing tip in accordance with a wing tip movement operation.

Disclosed herein is an example aircraft including a wing having a fixed wing portion and a wing tip moveably coupled to the fixed wing portion, a control surface on the wing, and an aircraft control system configured to determine a position of the control surface, determine whether the position of the control surface is an advantageous position or a non-advantageous position for folding the wing tip and, if the control surface is in the non-advantageous position, generate a control signal to move the control surface to the advantageous position.

Figure 1:
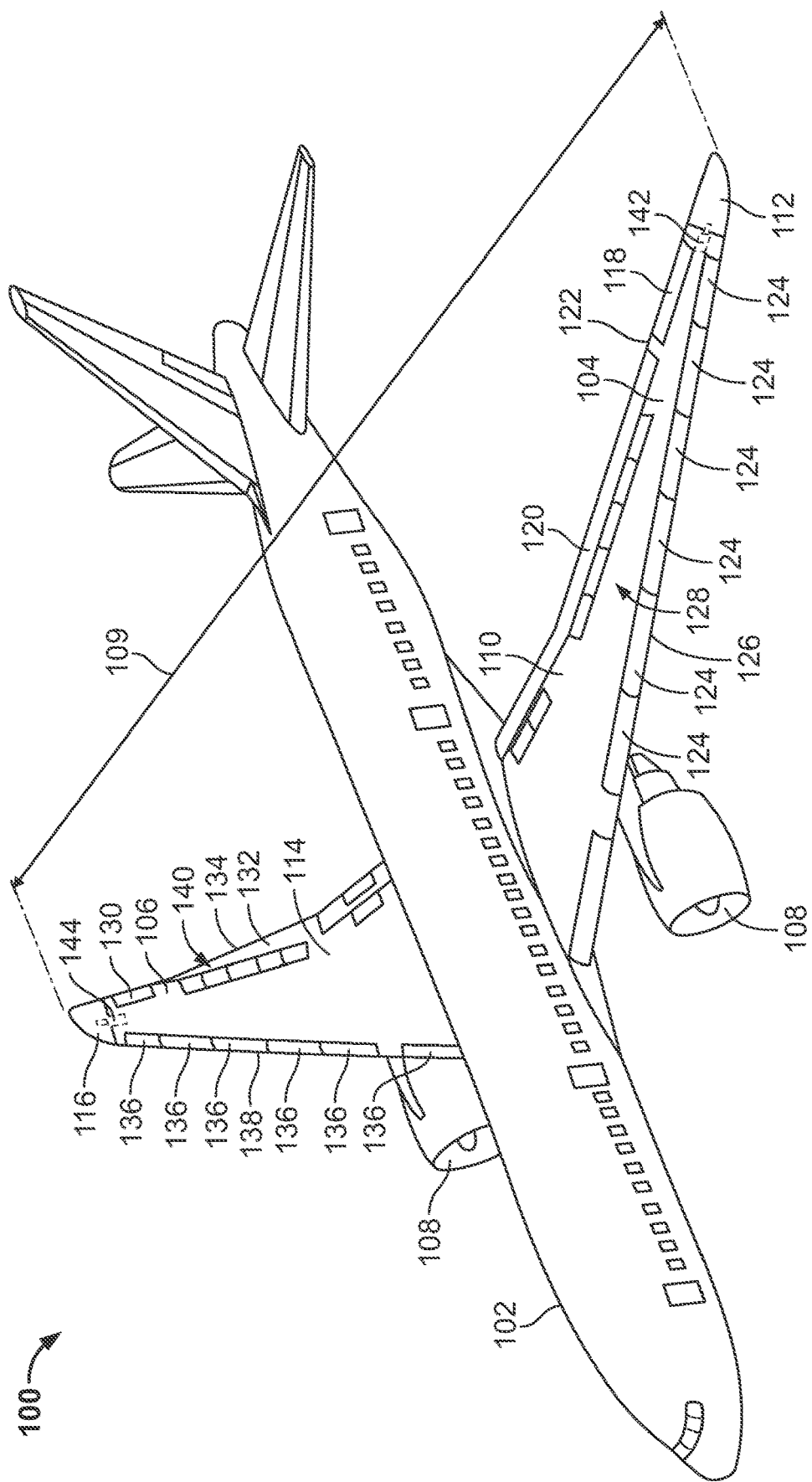
FIG. 1 illustrates an example aircraft that may be used to implement example methods, systems and apparatus disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Disclosed herein are example apparatus and methods that control airloads acting on aircraft wing tips by moving one or more control surface(s) on the wings to more advantageous position(s) that produce more or less airloads on the wing tips before transitioning the wing tips between an extended position to a folded position. The examples disclosed herein enable smaller, lighter wing tip actuation systems to be employed, thereby decreasing the weight of the wings and decreasing the space needed for accommodating the wing tip actuation systems in the wings of the aircraft. As a result, the wings can be thinner and lighter and, thus, produce more efficient flight.

Before turning to the detailed aspects of the disclosed aircraft control systems and methods, a brief discussion of folding wing tips is provided. It is generally known that longer, lighter and/or thinner wings are more aerodynamically efficient than shorter, heavier wings. Likewise, higher aspect ratio wings produce more efficient flight than lower aspect ratio wings. An aspect ratio of a wing is the ratio of its length to its breadth (chord). Therefore, longer, narrower wings are desirable because they produce more efficient flight (e.g., reduced fuel consumption). However, existing airports present challenges to aircraft having relatively large wingspans (e.g., the distance between the ends or tips of the wings). Airport designs are based on International Civil Aviation Organization (ICAO) Codes A through F, which establish dimensional limits on wingspans, landing gear, width, length, etc. Most airports are designed to accommodate aircraft up to ICAO Code E, which limits wingspans to less than 65 meters so that aircraft can fit through runways, taxiways, gate areas, etc. Therefore, aircraft with larger wingspans (e.g., greater than 65 meters) employ folding wing tips, which enables the wingspan of the aircraft to be reduced so that the aircraft can fit within the current airport infrastructure (e.g., parking areas, taxiways, etc.).

In regards to an aircraft having folding wing tips, each wing of the aircraft includes an inboard or fixed wing portion (e.g., section) and a movable or non-fixed outboard wing portion, i.e., the wing tip, that is moveably coupled to the fixed wing portion. In particular, the wing tips are rotatably coupled to the respective fixed wing portions via hinges. To move or transition the wing tips from an extended position (e.g., a deployed position, a flight position, an unfolded position, etc.) to a folded position (e.g., a stowed, a stored position, etc.), aircraft include folding wing tip actuation systems. The actuation systems include one or more actuators located between the fixed wing portions of the wings and the wing tips. The actuators move (e.g., lift, transition, rotate, etc.) the wing tips about their respective hinges from the extended position to the folded position.

As mentioned above, aircraft wings are generally designed to be as thin and as light as possible. However, the thickness and weight of the wing is significantly affected by the systems, components, etc. carried by the wing, such as the components of the folding wing tip actuation systems, including the actuators, hydraulic lines, etc. In particular, the wings must be thick enough to accommodate the actuator(s), hydraulic line(s), etc. of the folding wing tip actuation systems, which add weight to the wings. In general, external loads acting upon a folding wing tip actuation system include three main components: the weight of the wing tip; the dynamic effects of moving the mass of the wing tip; and the airloads (e.g., aerodynamic forces) acting upon the wing tip. The folding wing tip actuation systems are sized based on the power needed to lift the wing tips against these (and/or other) adverse forces.

Disclosed herein are example apparatus and methods for utilizing control surfaces on the wings of an aircraft near the wing tips to control airloads and the resulting hinge moments on the wing tips prior to transitioning the wing tips between the extended and folded positions. In some examples, the apparatus and methods decrease airloads on the wing tips prior to folding the wing tips, thereby decreasing the actuation power or force needed to fold the wing tips. The examples disclosed herein may be used to move (e.g., transition, deflect) one or more control surface(s), such as the aileron(s), slat(s), etc., near (and/or on) the wing tips to more advantageous position(s) that minimize the negative airloads (and, thus, the resulting hinge moments) produced on the folding wing tips. As a result, decreased airloads or forces (e.g., a negative hinge moment) are acting against the wing tips as the wing tips are being transitioned from the extended position to the folded position. Conversely, the example apparatus and methods disclosed herein may be used to increase airloads and/or the resulting hinge moment on the wing tips prior to moving the wing tips from the folded position to the extended position, thereby pushing the wing tips down toward the extended position. In some examples, one or more control laws (e.g., checks, inhibits) are performed based on inputs such as ground speed, weight on wheels, etc. to ensure that the control surface command(s) are only invoked at appropriate times.

For example, aircraft employ multiple control surfaces (e.g., aerodynamic surfaces, flight control surfaces, etc.) to control the aircraft during flight. Control surfaces may include, for example, ailerons, slats, flaperons, etc. On the ground, the control surfaces may be used for increasing drag for braking (e.g., stopping), reducing lift for increasing the weight on the wheels, keeping an aircraft level during cross-wind takeoffs and landings, etc. When landing, certain ones of the control surfaces are deployed or moved to certain positions to increase drag and/or reduce lift. However, in some instances, the specific positions or orientations of the control surface(s) direct airflow towards the direction of the wing tips and/or otherwise increase the power needed to move the wing tips to the folded position (e.g., by creating a negative moment about the hinges). As a result, more force is needed by the folding wing tip actuation systems to counter this force and move the wing tips to the folded position. Larger forces generally equate to larger and heavier actuation systems. The example aircraft control systems and methods disclosed herein instead determine whether one or more of the control surface(s) are in such negative or non-advantageous position(s) and, if so, produce command(s) to move the control surface(s) to other, more advantageous positions that result in reduced negative airloads on the wing tips.

For example, the ailerons near the folding wing tips are typically oriented in a trailing edge up position when landing, which improves braking performance by increasing drag and increasing the weight on the wheels. However, for swept wings, having the ailerons in the trailing edge up positions results in the airflow across the wing being directed (e.g., funneled) towards the wing tips. When the wing tips are transitioned to the folded position, this increased airflow towards the wing tips creates a large negative hinge moment, which needs to be overcome by the wing tip actuation systems. As a result, increased power is required to move the wing tips. Therefore, rather than leaving the ailerons in these non-advantageous positions, the example aircraft control apparatus and methods disclosed herein implement one or more control laws that determine if it is safe to adjust the positions of the ailerons (e.g., based on ground speed, pilot input, etc.) and, if so, move the ailerons to advantageous positions, such as a faired position (e.g., a neutral position) or a trailing edge down position. In the faired position or the trailing edge down position, the air flowing inboard to outboard over the wing is not funneled towards the wing tip. As a result, the negative airloads (and, thus, the resulting hinge moment) on the wing tip when folding the wing tip are significantly reduced than compared to the airloads produced in the trailing edge up position.

Additionally or alternatively, in some examples other control surfaces can be moved to or maintained in positions that result in reduced negative airloads on the wing tips. For example, the control surfaces on the leading edge of the wing, such as a leading edge slat, a variable camber krueger, a simple krueger, etc., direct airflow away from the folding wing tip and/or can be positioned to direct airflow in a beneficial manner (e.g., by creating a positive lift force near the end of the wing, thus reducing the negative hinge moment that opposes lifting of the wing tip) for moving the wing tip.

In some examples, the leading edge control surfaces, such as the slats, are in the most advantageous position during landing. However, after landing, a pilot may implement a clean-up operation that retracts the leading edge control surfaces. The example aircraft control apparatus and methods disclosed herein may suspend or inhibit these commands and prevent the leading edge control surfaces from being retracted, thereby maintaining the leading edge control surfaces in the most advantageous position for lifting the wing tips.

Conversely, when lowering the wing tips before flight, the example aircraft control apparatus and methods disclosed herein may utilize one or more of the control surfaces on the wings to direct airflow toward the wing tips, thus increasing airloads and helping to lower the wing tips. In other words, the example systems and methods disclosed herein can be implemented to redirect airflow onto the wing tips and/or otherwise create a negative hinge moment (e.g., a moment in the direction of extending) using the position of the nearby control surfaces.

By reducing the power demands of the folding wing tip actuation systems, the associated wing tip actuators, hydraulic lines, etc. can all be sized to produce less power. Therefore, smaller (e.g., more compact) and lighter actuation systems can be employed. As a result, the space needed to accommodate the actuating systems is reduced, and the weight added to the wing by the actuating systems is greatly reduced. Thus, the overall efficiency of the aircraft can be increased by employing smaller and lighter wing tip actuating systems.

FIG. 1 illustrates an example aircraft 100 in which the examples disclosed herein may be implemented. In the illustrated example, the aircraft 100 includes a fuselage 102, a first or left wing 104 coupled to the fuselage 102, and a second or right wing 106 coupled to the fuselage 102. The first and second wings 104, 106 carry respective engines 108. In the illustrated example, the first and second wings 104, 106 include wing tips, which may be transitioned from an extended or flight position (as shown in the position in FIG. 1) to a stored or folded position to decrease a wingspan 109 of the aircraft 100. In particular, the first wing 104 includes a first fixed wing portion 110 (e.g., an inboard wing portion) and a first wing tip 112 (e.g., a non-fixed portion, an outboard wing portion). The first wing tip 112 is hingeably coupled to the first fixed wing portion 110 and rotates or folds upward about a hinge line to move between the extended position and the folded position. Similarly, the second wing 106 includes a second fixed wing portion 114 and a second wing tip 116, which is hingeably coupled to the second fixed wing portion 114. The first and second wing tips 112, 116 are actuated by respective wing tip actuators (as disclosed in further detailed herein) to move or transition the first and second wing tips 112, 116 between the extended position, as shown in FIG. 1, and the folded position, in which the first and second wing tips 112, 116 are rotated upwards. In some examples, the first and second wing tips 112, 116 are about 10 feet in length. As such, the wingspan 109 can be decreased by about 20 feet by folding the first and second wing tips 112, 116. When in the folded position, the aircraft 100 may comply with the ICAO Code E size limitations (e.g., under 65 meters), for example. In other examples, the first and second fixed wing portions 110, 114, and/or the first and second wing tips 112, 116 may be longer or shorter, and the wing tip may be folded up, down, forward, aft or a combination thereof.

In the illustrated example, the first and second wings 104, 106 of the example aircraft 100 carry multiple control surfaces (e.g., aerodynamic surfaces, auxiliary airfoils, etc.) that are located on the first and second wings 104, 106 (e.g., along the leading and trailing edges of the first and second wings 104, 106). The control surfaces may be displaced or extended to change the aerodynamic lift of the aircraft 100 during takeoff or landing, for example. In the illustrated example, the first wing 104 includes a first aileron 118 and a first flaperon 120 located along a trailing edge 122 of the first wing 104. In some examples, the first wing 104 may include multiple ailerons and/or multiple flaperons. In the illustrated example, the first wing 104 also includes a plurality of leading edge slats 124 located along a leading edge 126 of the first wing 104. In the illustrated example, the first wing 104 includes seven (7) leading edge slats 124. However, in other examples, the first wing 104 may include more or fewer leading edge slats 124. To help slow the aircraft 100, the first wing 104 may also include a first plurality of spoilers 128 disposed on a top surface of the first wing 104. Similarly, the second wing 106 includes a second aileron 130 and a second flaperon 132 located along a trailing edge 134, a second plurality of leading edge slats 136 along a leading edge 138, and a second plurality of spoilers 140 on a top surface of the second wing 106. In other examples, the first wing 104 and/or the second wing 106 may include more or fewer control surfaces (e.g., ailerons, flaperons, spoilers, trim tabs, leading edge slats, trailing edge slats, etc.).

In the illustrated example, the wingspan 109 between the first and second wing tips 112, 116, which are in the extended or flight position, is relatively large. To reduce the wingspan 109 (e.g., after landing, before taxiing to a gate, etc.), the first and second wing tips 112, 116 may be moved to the folded position. The first wing 104 includes a first wing tip actuator 142 to transition the first wing tip 112 between the extended position and the folded position. The second wing 106 includes a second wing tip actuator 144 to transition the second wing tip 116 between the extended position and the folded position. The first and second wing tip actuators 142, 144 may be hydraulic actuators, for example.

During landing, a brake or speed brake command is typically implemented (e.g., by the pilot), which actuates one or more of the control surfaces on the wings 104, 106 to move to certain positions to help slow the aircraft 100.

Figure 2:
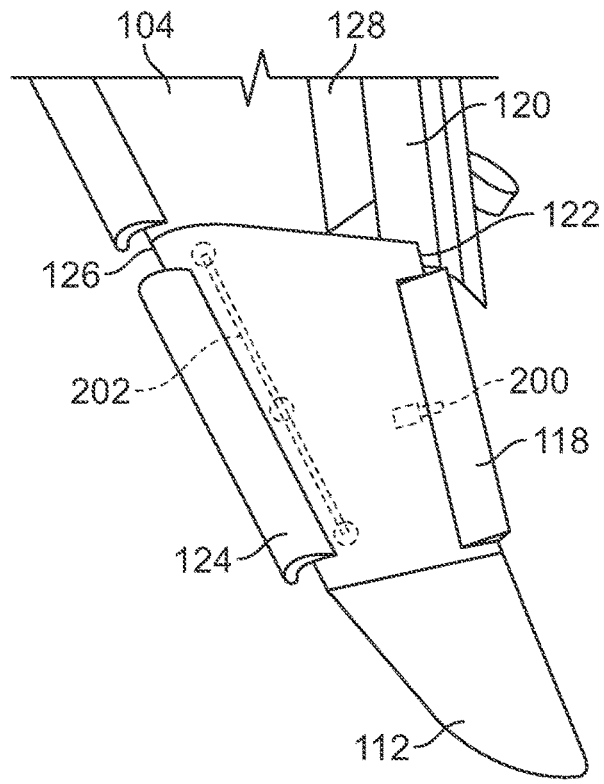
FIG. 2 illustrates example control surfaces deployed on an example wing of the example aircraft of FIG. 1 during an air brake while landing.

FIG. 2 illustrates an example of the control surfaces on the first wing 104 as positioned during a landing. In the illustrated example, for instance, an aileron actuator 200 moves the first aileron 118 to a trailing edge up position. Likewise, a slat actuator 202 is illustrated for deploying a first or outboard one of the leading edge slats 124. The other leading edge slats 124 may be similarly deployed. In some examples, the slat actuator 202 actuates or controls multiple ones of the leading edge slats 124 along the leading edge 126 of the first wing 104. Additionally, the flaperon 120 is extended from the trailing edge 122 and the spoilers 128 are lifted. The spoilers 128 and the flaperon 120 may include actuators similar to the aileron actuator 200 and/or the slat actuator 202. The configuration of the control surfaces illustrated in FIG. 2 increases drag and/or increases the weight on the wheels of the aircraft 100, which helps slow the aircraft 100. However, the position(s) of one or more of the control surface(s) often creates forces or airloads that oppose or increase the force needed to lift the first wing tip 112.

Figure 3:
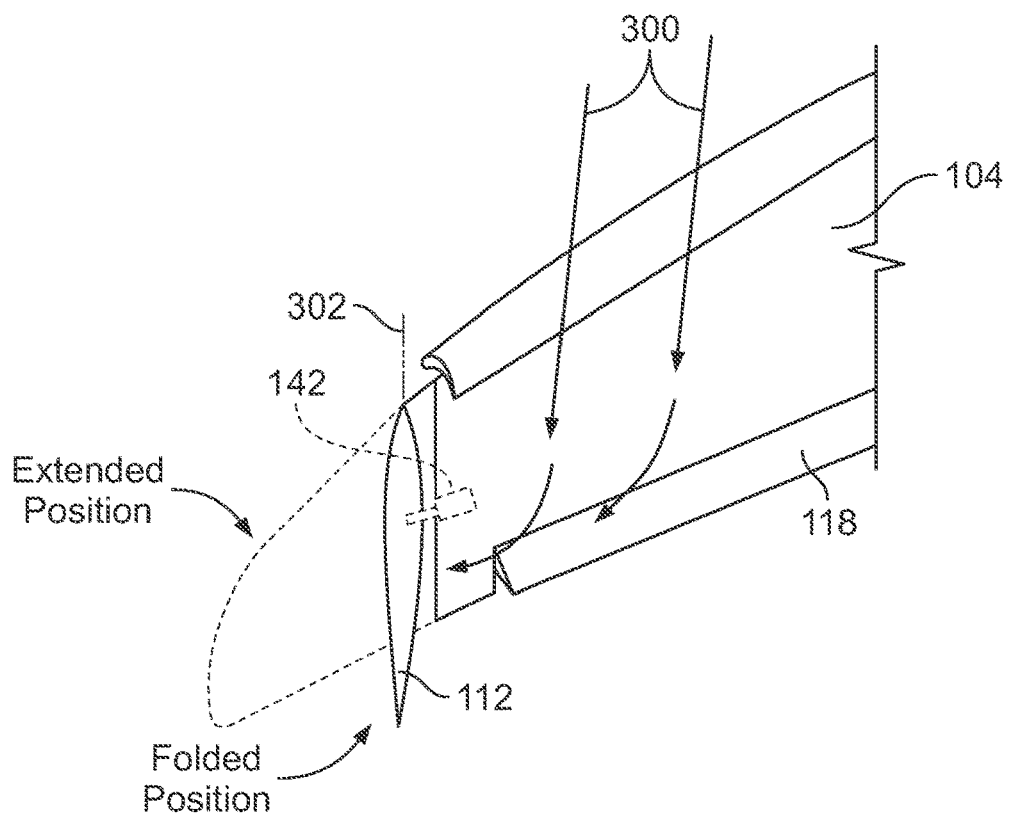
FIG. 3 is a top view of the example wing of FIG. 2 showing an example airflow over the example wing while transitioning an example wing tip from an extended position to a folded position.

FIG. 3 is a top view of the end of the first wing 104 when the control surfaces are deployed during the air brake, as in FIG. 2. As illustrated, oncoming airflow 300 is directed by the first aileron 118 outwards (e.g., from inboard to outboard), towards the first wing tip 112. In other words, the first aileron 118 funnels or redirects the airflow 300 coming over the top of the first wing 104 toward the direction of the first wing tip 112, thus creating a negative hinge moment about a hinge line 302. As a result, greater power is needed by the first wing tip actuator 142 to lift the first wing tip 112 from the extended position (shown in dashed lines) to the folded or stored position to overcome the negative hinge moment (e.g., the counter force) from the airflow 300.

Figure 4:
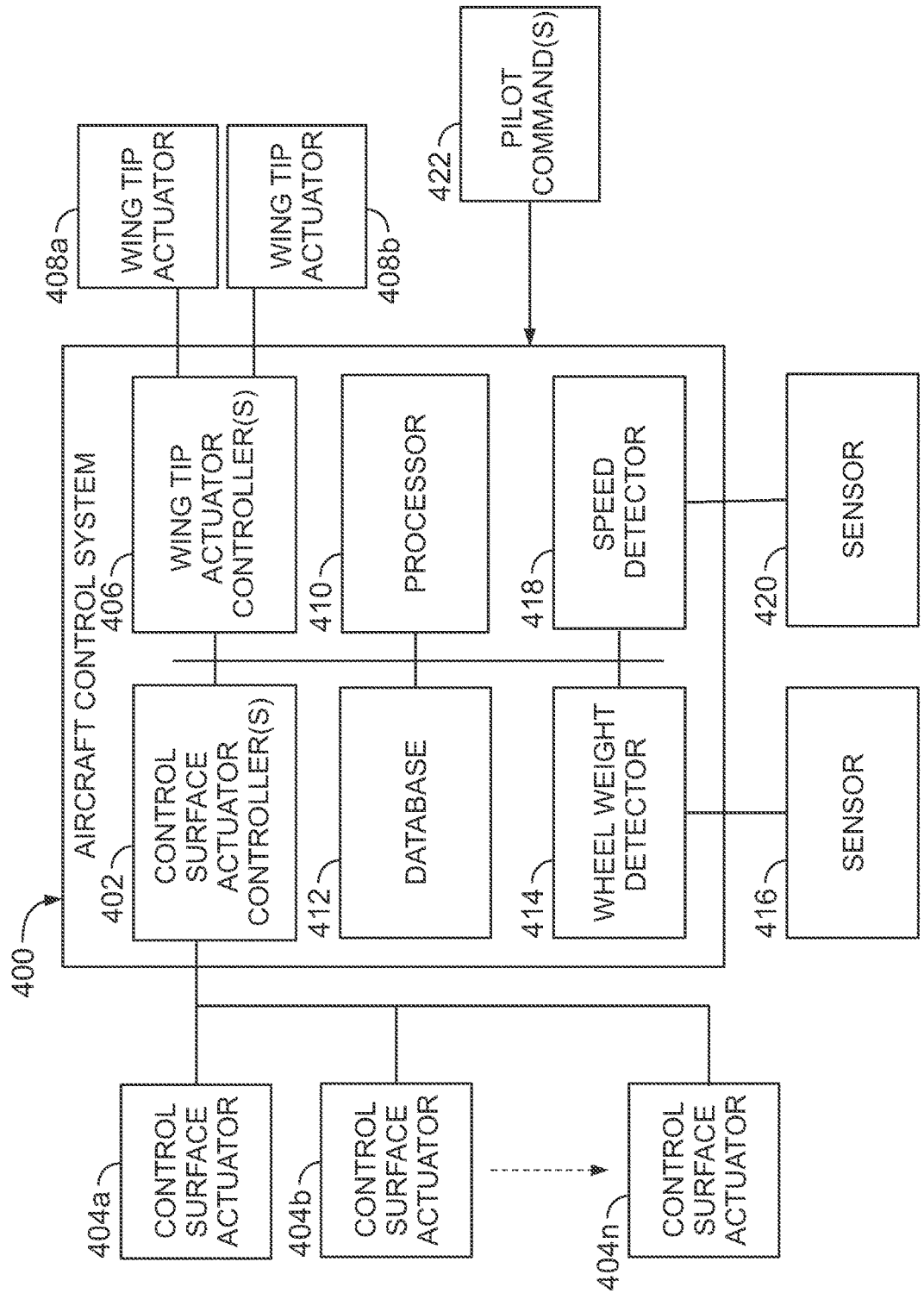
FIG. 4 is block diagram of an example aircraft control system that may be implemented by the example aircraft of FIG. 1.

FIG. 4 is an example aircraft control apparatus or system 400 that may be implemented by the example aircraft 100 of FIG. 1 in accordance with the teachings of this disclosure. The example system 400 may be used to move one or more of the control surfaces of the first and second wings 104, 106 to positions that increase and/or decrease the airloads on the first and second wing tips 104, 106 and, thus, minimize the amount of actuation force needed to lift the first and second wing tips 112, 116. In the illustrated example, the system 400 includes a control surface actuator controller 402, which may be implemented as multiple controllers. The control surface actuator controller(s) 402 controls one or more control surface actuators 404a-n (e.g., via control signals). The control surface actuator(s) 404a-n correspond to the one or more actuator(s) that move the various control surfaces on the aircraft 100. For example, a first control surface actuator 404a may correspond to the aileron actuator 200 (FIG. 2), which moves the first aileron 118, a second control surface actuator 404b may correspond to the slat actuator 202 (FIG. 2), which moves a first or outboard one of the leading edge slats 124, etc.

In the illustrated example, the system 400 includes a wing tip actuator controller 406, which may be implemented as multiple controllers. The wing tip controller(s) 406 control a first wing tip actuator 408a and/or a second wing tip actuator 408b. The first wing tip actuator 408a may correspond to, for example, the first wing tip actuator 142 (FIGS. 1 and 3) that moves the first wing tip 112 between the extended and folded positions. Similarly, the second wing tip actuator 408b may correspond to the second wing tip actuator 144 (FIG. 1) that moves the second wing tip 116 between the extended and folded positions. In some examples, the first wing tip actuator 408a and/or the second wing tip actuator 408b include multiple actuators (e.g., the first wing tip actuator 142 may include two actuators that act on the first wing tip 112).

In the illustrated example, the system 400 includes a processor 410 and a database 412. The processor 410 may determine what position the control surface(s) are in and whether those control surface(s) can be moved to more advantageous position(s) before folding the first and second wing tips 112, 116. In some examples, the processor 410 and/or the database 412 may implement on or more control laws (as discussed in further detail here) based on one or more inputs to determine whether the control surface(s) may be moved.

When a wing tip fold operation is instructed (for moving the first and second wing tips 112, 116 from the extended position to the folded position), which may be automatic or by pilot command, the example processor 410 determines the current position(s) of the one or more control surface(s) that may affect the airloads on the wing tips 112, 116. In some examples, the database 412 includes a listing (e.g., identification) of which ones of the control surface(s) affect the airloads on the wing tips 112, 116 (e.g., the first aileron 118, the first leading edge slat 124, etc.). In some examples, only the control surfaces adjacent the first and second wing tips 112, 116 (e.g., the first aileron 118, the outboard one of the leading edge slats 124 on the first wing 104, the second aileron 130, and the outboard one of the leading edge slats 126 on the second wing 106) are designated as the control surfaces to be moved. In other examples, more or fewer of the control surfaces may be designated. In the illustrated example, the processor 410 receives the data corresponding to the position(s) of the control surface(s) from the control surface actuator controller(s) 402.

Once the processor 410 determines the position(s) of the control surface(s), the processor 410 determines whether the control surface(s) are in an advantageous position or a non-advantageous position for folding the first wing tip 112. When folding a wing tip, for example, a non-advantageous position is a position in which the control surface generates the most or a relatively large amount of airflow towards a wing tip and/or otherwise creates a force (e.g., a negative hinge moment) in the opposite direction in which a wing tip is to be folded as compared to other positions of the control surface. An advantageous position, on the other hand, is a position in which the control surface generates the least or less airload on a wing tip and/or otherwise does not contribute to a force in the opposite direction as compared to other positions of the control surface. If the control surface is in a non-advantageous position, for example, the processor 410 determines a change in the position of the control surface from a first position (e.g., the non-advantageous position) to a second position (e.g., the advantageous position) for facilitating movement of the wing tip (e.g., from the extended position to the folded position, from the folded position to the extended position) while the aircraft 100 is on the ground (e.g., not in flight). For example, a non-advantageous position for the first aileron 118 may be the trailing edge up position as shown in FIGS. 2 and 3, which generates airloads on the first wing tip 112 by directing the airflow 300 towards the first wing tip 112. An advantageous position for the first aileron 118, on the other hand, may be the faired position or the trailing edge down position, which produces less airload on the first wing tip 112 than when in the non-advantageous position. If the control surface is in an non-advantageous position, the processor 410 generates an instruction to move the respective control surface to the advantageous position. Based on the instruction, the control surface actuator controller(s) 402 may generate one or more control signal(s) to actuate the corresponding control surface actuator(s) 404a-404n to move the respective control surface to the advantageous position. In some examples, there may be multiple non-advantageous positions and/or multiple advantageous positions for the control surface(s), which may be stored in the database 412, for example.

Figure 5:
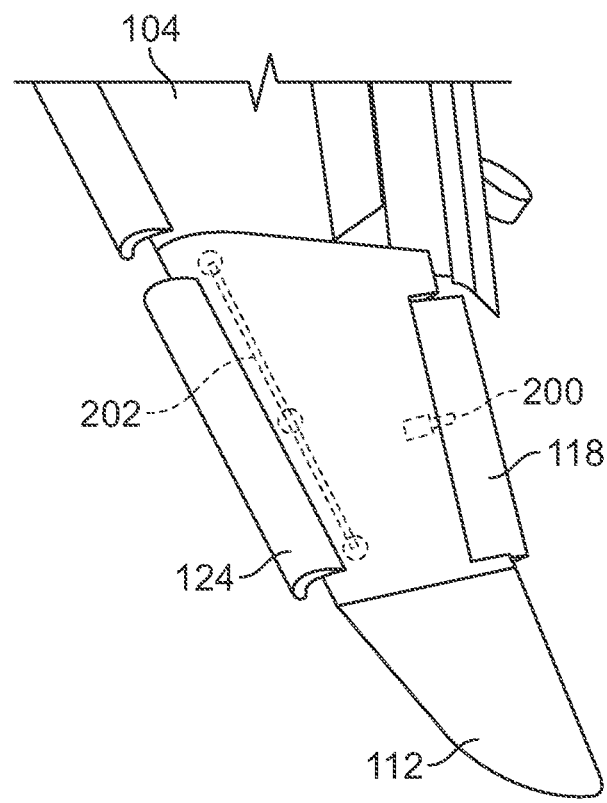
FIG. 5 illustrates the example control surfaces on an example wing of the example aircraft of FIG. 1 in a more advantageous position for folding an example wing tip.
Figure 6:
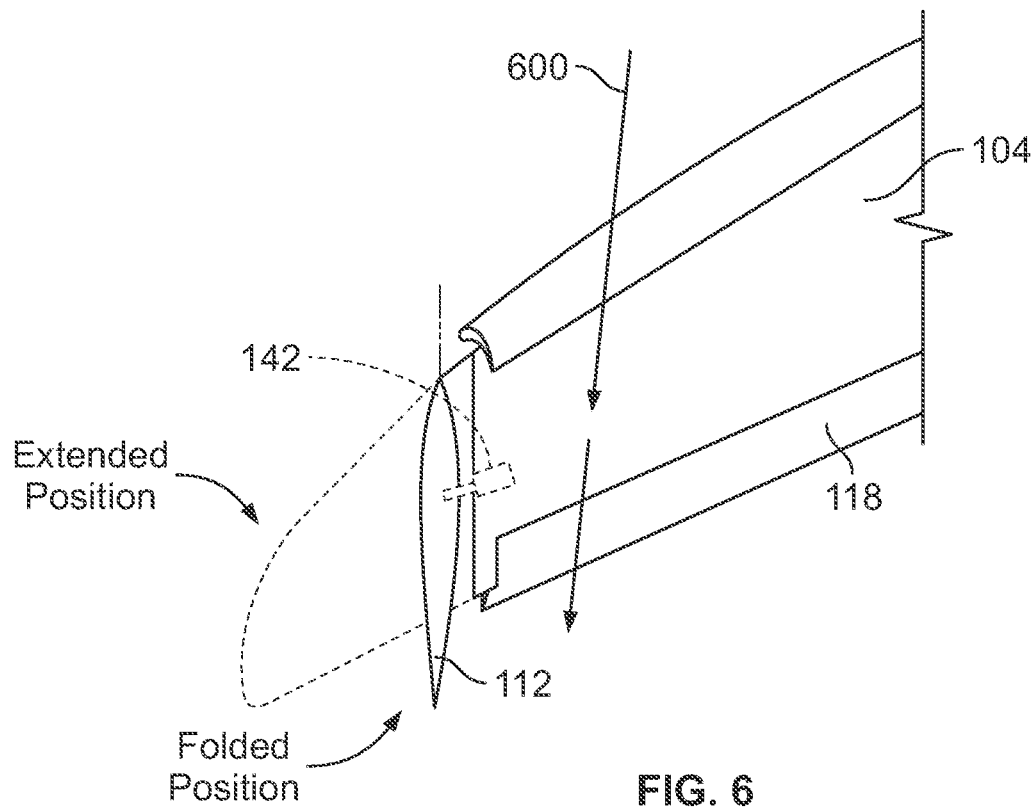
FIG. 6 is a top view of the example wing of FIG. 5 showing an example airflow over the example wing while transitioning the example wing tip from an extended position to a folded position.

FIG. 5 shows the first aileron 118 on the first wing 104 in a trailing edge down position. If the first aileron 118 is in a non-advantageous position for folding the first wing tip 112, such as the trailing edge up position shown in FIGS. 2 and 3, the control surface actuator controller(s) 402 may send a control signal to the control surface actuator 404a for the first aileron 118 (e.g., the aileron actuator 200) to move the first aileron 118 to an advantageous position, such as the trailing edge down position shown in FIG. 5. FIG. 6 is a top view of the end of the first wing 104 with the first aileron 118 in the trailing edge down position. As illustrated, airflow 600 travels over the first wing 104 and is not redirected toward the first wing tip 112, as was shown in FIG. 3 in the non-advantageous position. Thus, the example system 400 minimizes the airload on the first wing tip 112 by moving the first aileron 118 from a non-advantageous position (e.g., the trailing edge up position) to an advantageous position (e.g., the trailing edge down position).

Additionally or alternatively, in some examples one or more of the leading edge slats 124 may be moved from a non-advantageous position to an advantageous position that minimizes the airflow toward the first wing tip 112. In some examples, the outboard one of the leading edge slats 124 (illustrated in FIGS. 5 and 6) generates more lift near the end of the first wing 104 when the leading edge slat 124 is in the deployed or extended position, as shown in FIG. 5. In other words, in the deployed position, the outboard leading edge slat 124 reduces the negative hinge moment on the first wing tip 112. Therefore, the extended position of the outboard leading edge slat 124 may be an advantageous position, whereas a non-deployed or stored position of the outboard leading edge slat 124 may be a non-advantageous position. The processor 410 may determine a position of the outboard leading edge slat 124 (e.g., based on the control surface actuator controller(s) 402) and, if the outboard leading edge slat 124 is not in the advantageous position, the processor 410 may generate an instruction to move the outboard leading edge slat 124 to the advantageous position. The control surface actuator controller(s) 402 may generate one or more control signal(s) to actuate the control surface actuator(s) 404a-n (e.g., the slat actuator 202) to move the outboard leading edge slat 124 to the advantageous position (e.g., the deployed position as shown in FIG. 5). This process may be repeated for multiple ones of the control surfaces. In some examples, only certain or designated ones of the control surfaces have an effect on the airload on the first wing tip 112, whereas other ones of the control surfaces (e.g., the inboard ones of the leading edge slats 124, the flaperon 120, the first plurality of spoilers 128, etc.) may not have an effect on the airload. In some examples, all of the designated control surfaces are active or moved simultaneously. After the one or more control surfaces have been moved to their advantageous position(s) or are determined to be in their advantageous position(s), the processor 410 may instruct the wing tip actuator controller 406, which controls the wing tip actuator 408a (e.g., the first wing tip actuator 142), to transition (e.g., move) the first wing tip 112 between the extended position (shown in dashed lines) and the folded or stored position, as shown in FIG. 6.

Conversely, when moving the first and second wing tips 112, 116 from the folded position to the extended position (e.g., while taxiing to a runway prior to takeoff), the example aircraft control system 400 of FIG. 4 may move one or more of the control surface(s) on the first and second wings 104, 106 to increase the airloads on the first and second wing tips 112, 116 and/or otherwise create a negative hinge moment. When unfolding a wing tip, for example, an advantageous position is a position in which a control surface generates the most or a relatively large amount of airflow towards a wing tip and/or otherwise creates a force (e.g., a negative hinge moment) in the direction in which a wing tip is to be unfolded as compared to other positions of the control surface. A non-advantageous position, on the other hand, may be a position in which the control surface generates the least or less airload on a wing tip and/or otherwise does not contribute to a force in the direction in which the wing tip is to be unfolded as compared to other positions of the control surface. For example, an advantageous position for the first aileron 118 when unfolding the first wing tip 112 may be the trailing edge up position as shown in FIGS. 2 and 3, which generates airloads on the first wing tip 112 by directing the airflow 300 towards the first wing tip 112. Therefore, the aircraft control system 400 may be used to direct airflow to flow towards the upper surface of the first wing 104 when trying to move the first wing tip 112 down (FIG. 3) or direct airflow away from the upper surface when trying to move the first wing tip 112 up (FIG. 6). The example processor 410 may determine whether a control surface is in an advantageous position or a non-advantageous position for unfolding a wing tip. If the control surface is in an non-advantageous position, the processor 410 generates an instruction to move the respective control surface to the advantageous position. Based on the instruction, the control surface actuator controller(s) 402 may generate one or more control signal(s) to actuate the corresponding control surface actuator(s) 404a-404n to move the respective control surface to the advantageous position.

In some examples, prior to instructing a control surface to be moved, the processor 410 determines whether the control surface can be moved based one or more control laws, which may be based on one or more inputs (e.g., ground speed, wind direction, etc.). For example, one control law (e.g., a wheels-on-the-ground control law) may specify that the control surface(s) can only be moved to the advantageous position(s) if the aircraft 100 is determined to be on the ground. To determine if the aircraft 100 is on the ground (e.g., has landed, prior to takeoff, is not in flight), the aircraft control system 400 of FIG. 4 includes a wheel weight detector 414 that receives signals from a sensor 416 (e.g., a wheel weight sensor) and determines whether the aircraft 100 is on the ground. If the processor 410 determines the aircraft 100 is on the ground (e.g., based on the input from the wheel weight detector 414 and/or the sensor 416), the instruction is sent to the control surface actuator controller(s) 402, which may generate control signal(s) to move the control surface(s) to the desired or advantageous position(s). Otherwise, if the processor 410 determines the aircraft 100 has not landed, the processor 410 suspends or inhibits the desired movement of the control surface(s) to the advantageous position(s). Therefore, the example control law prevents the control surface(s) from being moved while the aircraft 100 is still in flight.

Another example control law (which may be implemented in addition to or as an alternative to the wheels-on-the-ground control law described above) may specify that the control surface(s) can only be moved to the more advantageous position if the aircraft 100 is traveling under a threshold or trigger speed such as, for example, 15 knots. The trigger speed may be stored in the database 412, for example, and may be based on the design (e.g., weight, wingspan, etc.) of the aircraft 100. In some examples, the trigger speed is a speed at which the control surface(s) that are to be moved (e.g., the first aileron 118, the leading edge slat 124, the control surface(s) adjacent the first wing tip 112, etc.) are no longer aerodynamically effective. In other words, under the trigger speed, the control surface(s) have little or no effect on the movement/control of the aircraft 100. Therefore, the control surface(s) may be moved to different position(s) without affecting control of the aircraft 100 while landing. To determine the speed of the aircraft 100, the aircraft control system 400 of FIG. 4 includes a speed detector 418 (e.g., a speedometer) that receives signals from a sensor 420 to determine the speed (e.g., ground speed and/or relatively wind speed) of the aircraft 100. The processor 410 compares the current speed of the aircraft 100

(e.g., as determined based on the input from the speed detector 418 and/or the sensor 420) to the trigger speed stored in the database 412. If the processor determines the aircraft 100 is traveling below the trigger speed, the processor 410 sends the instruction to the control surface actuator controller(s) 402, which generate control signal(s) to move the control surface(s) to the desired or advantageous position(s). Otherwise, if the aircraft 100 is traveling above the trigger speed, the processor 410 suspends or inhibits (e.g., prevents) the desired movement of the control surface(s) to the advantageous position(s). In some examples, the processor 410 may not even determine a desired change in the position of the control surface if the speed is above the trigger speed.

Another example control law may be based on whether the movement of the control surface(s) from the non-advantageous position(s) to the advantageous position(s) is adverse to a one or more pilot command(s) 422 (FIG. 4). The processor 410 may determine, based on a control law, whether or not the pilot command(s) 422 can be overridden or suspended and/or otherwise modified. For example, as mentioned above, a pilot may implement an air brake command, which causes certain ones of the control surfaces to deploy to certain positions to slow the aircraft 100. In such an example, the processor 410 determines, based on the speed detector 414, whether the aircraft 100 is travelling below the trigger speed. If the processor 410 determines the aircraft 100 is travelling below the trigger speed, the processor 410 may override or suspend the pilot command(s) 422. In such an example, the processor may send the instruction to the control surface actuator controller(s) 402, which may then generate control signal(s) to move the control surfaces (e.g., via the control surface actuators 404a-404n) to the advantageous positions. For example, the control surface actuator controller(s) 402 may generate a control signal to move the first aileron 118 to the faired position or the trailing edge down position. As discussed herein, below the trigger speed, the first aileron 118 may have little or no effect on the control of the aircraft 100. Thus, overriding or suspending the air brake command (e.g., as implemented by the pilot command(s) 422) does not adversely affect the slowing of the aircraft 100. Otherwise, if the processor 410 determines the aircraft 100 is not traveling below the trigger speed, the processor 410 may suspend the desired movement of the control surface to the advantageous position.

As another example, in some instances a pilot may implement a clean-up command after landing, which causes the control surfaces to retract to their stored positions. However, as mentioned above, the deployed or extended position of the outboard one of the leading edge slats 124 is advantageous to lifting the first wing tip 112. Therefore, if the pilot command 422 is such a command, the processor 410 may override or suspend the pilot command 422 to keep the outboard leading edge slat 124 in the extended position. In other examples, if the outboard leading edge slat 124 has already been retracted, the control surface actuator controller(s) 402 may generate on one more control signal(s) to re-extend or deploy the leading edge slat 124, thereby positioning the outboard leading edge slat 124 in the advantageous position before folding the first wing tip 112.

In some examples, a control law may dictate that the pilot command(s) 422 may not be overridden or suspended by the wing tip control system 400. For example, if the pilot command(s) 422 are based on certain commands for controlling the aircraft 100, the processor 410 suspends or inhibits the desired movement of the control surface(s) (e.g., to avoid affecting the pilot's control of the aircraft 100). For instance, when landing in a cross-wind, a pilot may implement a roll command that causes certain ones of the control surfaces to deploy to help steer the aircraft 100. In such an example, the control law may dictate that the position of the control surfaces, whether advantageous or not, cannot be overridden or suspended. For example, if the wind is moving from the right to the left, the pilot may implement a roll command that rolls the aircraft 100 to the right (e.g., into the direction of the wind). As such, the pilot command(s) 422 cause the first aileron 118 (FIG. 1) to transition to the trailing edge down position and the second aileron 130 to transition to the trailing edge up position. In this configuration, the first aileron 118 is already positioned in the desired or advantageous position (e.g., the faired or trailing edge down position). Additionally, while the second aileron 130 may be in a trailing edge up position (which may not be advantageous during a direct or no wind situation), the wind is coming from the right, thereby helping to push the right wing tip 116 upward. Further, because the wind is moving from the right to the left, the airflow is generally not funneled back to the right by the second aileron 130. Thus, even when implementing a roll command, which the system 400 does not override, the first and second ailerons 118, 130 are in the most advantageous position for lifting the wing tips 112, 116. In some examples, multiple ones of the example control laws disclosed herein may be implemented. Additionally or alternatively, other types of control laws may be implemented. For example, a control law based on the direction of the wind relative to the aircraft 100 may be implemented. In such an example, a wind direction sensor and/or detector may be implemented in the example aircraft control system 400.

In some examples, the processor 410 may override or suspend the pilot command(s) 422 when the pilot command(s) 422 are symmetric commands but not override or suspend the pilot command(s) 422 when the pilot command(s) 422 are asymmetric commands. A symmetric command is a command where corresponding control surfaces on each wing are moved to the same position such as, for example, during a an air brake command. On the other hand, an asymmetric command is a command where a control surface on one of the wings is in one position and the corresponding control surface on the other wing is in a different position such as, for example, when implementing a roll command to steer the aircraft 100 into the direction of the wind. Therefore, in some examples, if the pilot command(s) 422 is/are a symmetric command (e.g., an air brake command), the processor 410 may override or suspend the symmetric command and send the instruction to the control surface actuator controller(s) 402, which may then move the control surface view the control surface actuator(s) 404a-404n. Otherwise, if the pilot command(s) 422 is/are an asymmetric command (e.g., a roll command), the processor 410 may suspend or prevent the desired movement of the control surface to the advantageous position.

In some examples, the spoilers 128, the flaperon 120 and/or any of the other control surfaces on the first wing 104 may be similarly be moved from non-advantageous position(s) to advantageous position(s) that reduce negative airloads on the first wing tip 112 and/or otherwise reduce a negative moment generated on the first wing tip 112. The example operations disclosed herein may likewise be applied to the second wing 106. In some examples, movement of the control surface(s) is performed simultaneously or substantially simultaneously (e.g., within a few seconds).

In other examples, the control surface(s) on the first and second wings 104, 106 may operate independently and/or at different times.

Figure 7A:
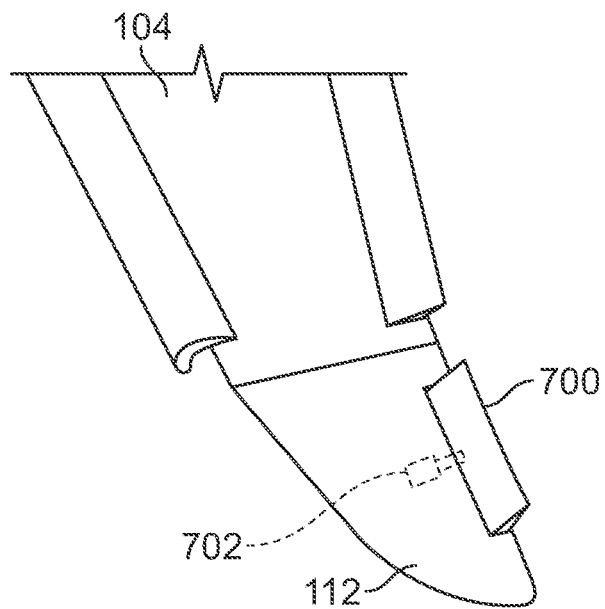
FIG. 7A illustrates an example wing tip of the example aircraft of FIG. 1 having an example wing tip aileron in a trailing edge up position.
Figure 7B:
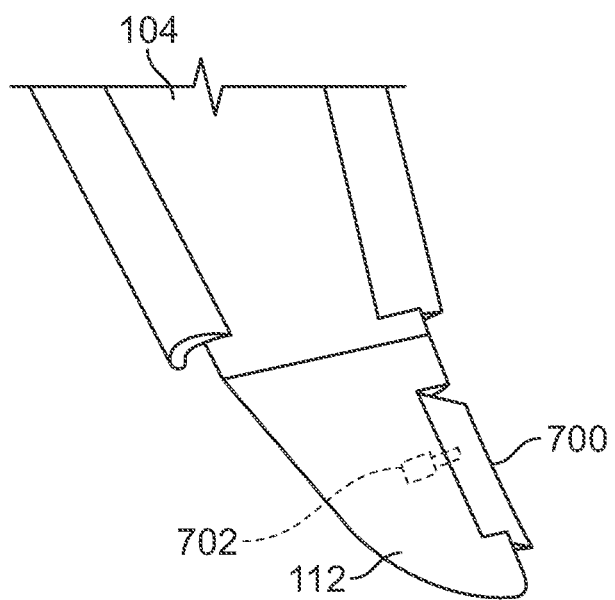
FIG. 7B illustrates the example wing tip of FIG. 7B with the example wing tip aileron in a trailing edge down position.

In some examples, an aircraft may include one or more control surface(s) (e.g., ailerons, trim tabs, etc.) on the wing tips. In addition to or as an alternative to moving one or more of the control surface(s) on the fixed wing portions of the wings, in some examples, the control surface(s) on the wing tips can be used to advantageously create lift to aid in lifting the wing tips during a wing tip fold operation. FIG. 7A illustrates the first wing 104 having a wing tip aileron 700 on the first wing tip 112. The wing tip aileron 700 is controlled by a wing tip aileron actuator 702. In FIG. 7A, the wing tip aileron 700 is in a trailing edge up position, which is a typical position during braking. However, in the faired or trailing edge down position, the wing tip aileron 700 generates more lift on the first wing tip 112, which aids in lifting the first wing tip 112 during a wing tip fold operation. Therefore, similar to the operations disclosed above for the control surface(s) on the first fixed wing section 110 of the first wing 104, the aircraft control system 400 may determine if the wing tip control surface(s) are in an advantageous position or a non-advantageous position (e.g., when the wing tip aileron 700 is in the trailing edge up position as shown in FIG. 7A). If the processor 410 determines the control surface(s) on the first wing tip 112 are in a non-advantageous position, the processor 410 generates an instruction to move the control surface(s) to the advantageous position. In some examples, the instruction may be checked against one or more of the control law(s), as disclosed above. If the instruction complies or satisfies the control law(s), for example, the control surface actuator controller(s) 402 generate control signal(s) to move the wing tip aileron 700 via the wing tip aileron actuator 702 to the faired or trailing edge down position, as illustrated in FIG. 7B. Once the wing tip aileron 700 is in the advantageous position (or at least moved from the non-advantageous position (e.g., a position that generates the least lift, a position that creates a negative hinge moment, a trailing edge up position)), the aircraft control system 400 may transition the first wing tip 112 from the extended position to the folded position. Otherwise, if the instruction violates the control law(s), the example system 400 suspends the desired movement. A similar operation may likewise be performed for the second wing tip 116 if the second wing tip 116 includes one or more control surface(s).

While an example manner of implementing the aircraft control system 400 is illustrated in FIG. 4, one or more of the elements, processes and/or devices illustrated in FIG. 4 may be combined, divided, re-arranged, omitted, eliminated and/or implemented in any other way. Further, the example control surface actuator controller(s) 402, the example wing tip actuator controller(s) 406, the example processor 410, the example database 412, the example wheel weight detector 414, the example speed detector 418 and/or, more generally, the example aircraft control system 400 of FIG. 4 may be implemented by hardware, software, firmware and/or any combination of hardware, software and/or firmware. Thus, for example, any of the example control surface actuator controller(s) 402, the example wing tip actuator controller(s) 406, the example processor 410, the example database 412, the example wheel weight detector 414, the example speed detector 418 and/or, more generally, the example aircraft control system 400 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example control surface actuator controller(s) 402, the example wing tip actuator controller(s) 406, the example processor 410, the example database 412, the example wheel weight detector 414, the example speed detector 418 is/are hereby expressly defined to include a tangible computer readable storage device or storage disk such as a memory, a digital versatile disk (DVD), a compact disk (CD), a Blu-ray disk, etc. storing the software and/or firmware. Further still, the example aircraft control system 400 of FIG. 4 may include one or more elements, processes and/or devices in addition to, or instead of, those illustrated in FIG. 4, and/or may include more than one of any or all of the illustrated elements, processes and devices.

Figure 8:
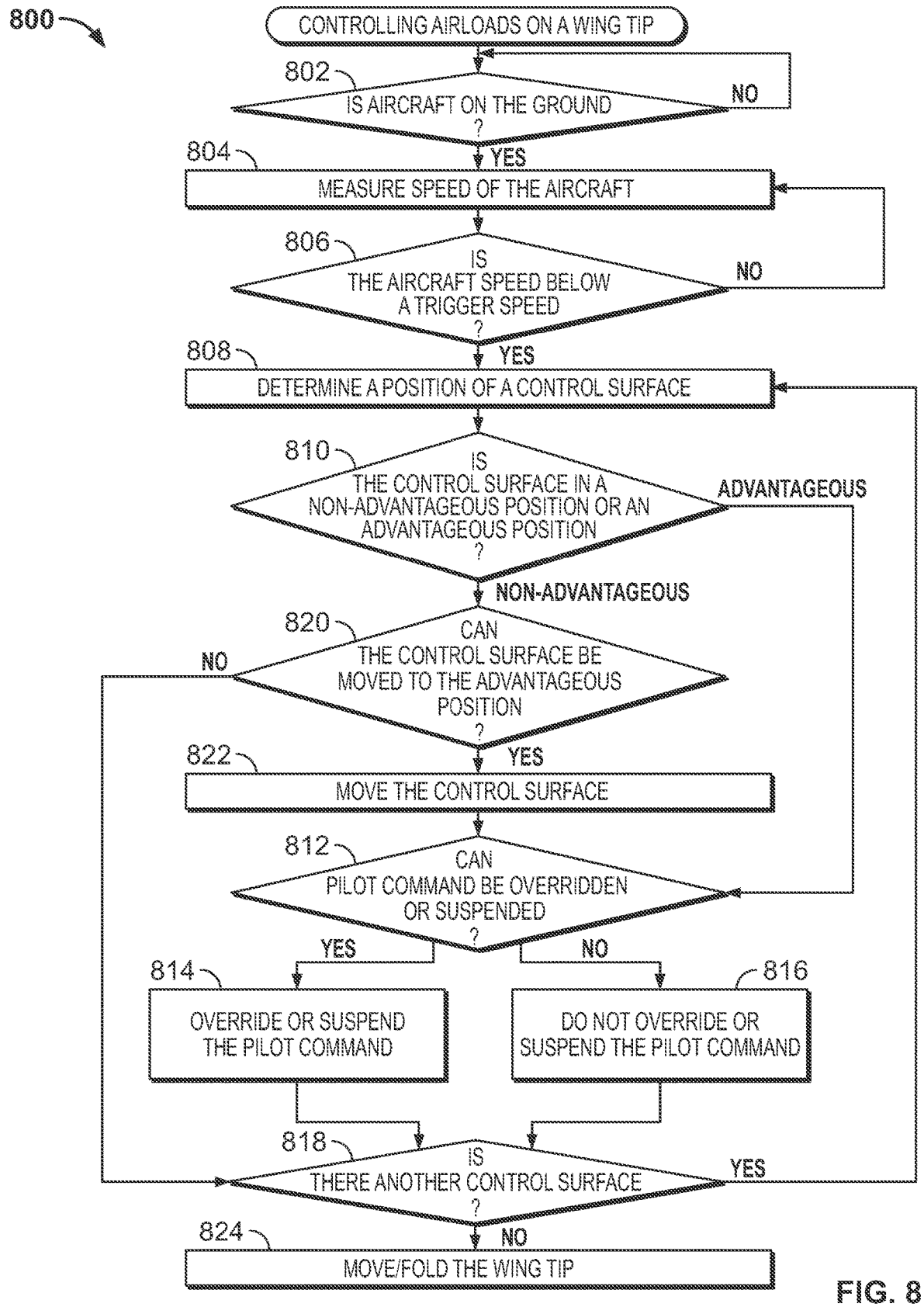
FIG. 8 is a flowchart representative of an example method or process that may be implemented by the example aircraft control system of FIG. 4.

A flowchart representative of an example method for implementing the example aircraft control system 400 of FIG. 4 is shown in FIG. 8. In this example, at least a portion of method may be implemented using machine readable instructions that comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example aircraft control system 400 of FIG. 4 may alternatively be used. For example, the order of execution of the blocks may be changed, and/or some of the blocks described may be changed, eliminated, or combined.

As mentioned above, the example method of FIG. 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 8 is a flowchart representative of an example process or method 800 that may be implemented by the example system 400 of FIG. 4 to transition one or more control surface(s) from a non-advantageous position to an advantageous position to control (e.g., increase or decrease) airloads on a wing tip. The example method 800 is described in connection with the example aircraft control system 400 of FIG. 4 and the example aircraft 100 of FIG. 1. However, it is understood that the example method 800 may be implemented on other aircraft and/or with other aircraft control system(s). The example method 800 may be performed prior to or during a wing tip fold operation (e.g., moving the wing tip from an extended position to a folded position, moving a wing tip from a folded position to an extended position). In some examples, the method 800 is implemented automatically. In other examples, the method 800 may be implemented via manual control or actuation by a pilot.

The example method 800 includes determining whether the aircraft 100 is on the ground (e.g., has landed, prior to takeoff, not in flight) (block 802). In the illustrated example of FIG. 4, the aircraft control system 400 includes the wheel weight detector 414 that can determine the weight on the wheels of the aircraft 100 (via input from the sensor 416). Based on the determination, the processor 410 can determine if the aircraft 100 is on the ground. In other examples, other devices and/or operations may be used to determine whether the aircraft 100 is on the ground (e.g., by determining whether the aircraft 100 is moving at a speed slower than the aircraft 100 can be airborne, by determining whether the aircraft 100 is parked, by determining whether the aircraft 100 is in "maintenance mode" where a mechanic may be working on the aircraft 100 in a hanger). If the aircraft 100 is not on the ground (e.g., has not yet landed), the aircraft control system 400 continues to monitor the aircraft 100 to determine whether the aircraft 100 is on the ground (e.g., and/or the aircraft control system 400 suspends any desired movement or instruction to move a control surface).

If the aircraft control system 400 determines the aircraft 100 is on the ground, the example method 800 includes measuring a speed of the aircraft 100 (block 804). The example aircraft control system 400 of FIG. 4 includes the speed detector 418, which can determine the speed of the aircraft 100 (via input from the sensor 420). The processor 410 determines whether the measured speed of the aircraft 100 is below a trigger speed (block 806), which may be stored in the database 412, for example. In some examples, the trigger speed is a speed at which one or more of the control surface(s) have little or no effect on the control of the aircraft 100. If the aircraft 100 is not traveling at a speed below the trigger speed, the aircraft control system 400 continues to measure the speed of the aircraft 100 to determine whether the aircraft 100 is traveling at a speed below the trigger speed (block 806) (e.g., and/or the aircraft control system 400 suspends any desired movement or instruction to move a control surface).

If the aircraft 100 is travelling at a speed below the trigger speed, the processor 410 determines a position of a control surface (block 808). The control surface may be a control surface on the fixed wing section 110 of the first wing 104 adjacent the first wing tip 112 (e.g., the first aileron 118, the leading edge last 124, etc.) or a control surface on the first wing tip 112 (e.g., the wing tip aileron 700). In some examples, only certain ones of the control surfaces are designated as able to affect the airloads on the first wing tip 112. For example, the control surfaces adjacent to or near the first wing tip 112, such as the first aileron 118 and/or the outboard one of the leading edge slats 124, may have an effect on the first wing tip 112, whereas the control surfaces more inboard on the first fixed wing portion 110 (e.g., the flaperon 120, the spoilers 128, the inboard ones of the leading edge slats 124, etc.) may not have an effect on the first wing tip 112. The processor 410 may receive information from the control surface actuator controller(s) 402 regarding the position of the control surface. For example, the processor 410 may determine the first aileron 118 is in the trailing edge up position, which is illustrated in the position shown in FIGS. 2 and 3.

After determining the position of the control surface (block 808), the example aircraft control system 400 determines whether the control surface is in a non-advantageous position or an advantageous position (block 810). A non-advantageous position for moving a wing tip from the extended position to the folded position may be, for example, a position in which the control surface generates the most or a large amount of airflow towards the wing tip and/or otherwise creates a force (e.g., a negative hinge moment) in the opposite direction in which the wing tip is to be folded as compared to other positions of the control surface. An advantageous position for moving a wing tip from the extended position to the folded position, on the other hand, may be a position in which the respective control surface generates the least or less airload on the wing tip than and/or otherwise does not contribute to a force (e.g., reduces the negative hinge moment) in the opposite direction as compared to other positions of the control surface. For example, in the instance of the first aileron 118, the trailing edge up position is a non-advantageous position, because it directs airflow towards the first wing tip 112, as illustrated in the position shown in FIG. 3. On the other hand, an advantageous position, for example, may be a faired position or a trailing edge down position, as illustrated in the position shown in FIGS. 5 and 6, where the first aileron 118 does not direct air at the first wing tip 112. The advantageous and non-advantageous positions for moving a wing tip from the folded position to the extended position (e.g., unfolding the wing tip), on the other hand, may be the opposite of the advantageous and non-advantageous positions for moving the wing tip from the extended position to the folded position. In some examples, there may be multiple advantageous positions and/or multiple non-advantageous positions. In some examples, when folding a wing tip, the advantageous position is the position in which the respective control surfaces causes the least amount airload on the wing tip that would oppose the transition of the wing tip. In other words, in some examples the advantageous position still creates an airload on the wing tip, but the airload is relatively less compared to the other possible positions of the respective control surface.

If the processor 410 determines the control surface is already in an advantageous position (block 810), the example method 800 includes determining whether a subsequent command (e.g., by a pilot) can be overridden or suspended (block 812). For example, if the control surface is in the desired or advantageous position and a subsequent pilot command tries to move the control surface out of the advantageous position, the processor 410 may override or suspend the pilot command(s) 422. For example, if the pilot implements a clean-up command to move the outboard one of the leading edge slats 124 to the stored position, the processor 410 may override or suspend the clean-up command (block 814) to maintain the outboard leading edge slat 124 in the advantageous position (e.g., the extended or deployed position). Otherwise, in some examples, the pilot command(s) 422 may not be overridden or suspended (block 816). Whether or not the pilot command(s) 422 can be overridden, the example method 800 then determines if there is another control surface that may be moved to a more advantageous position (block 818).

If the example aircraft control system 400 determines the control surface is in the non-advantageous position (block 808), the aircraft control system 400 determines a change (e.g., a desired change) in the position of the control surface from the non-advantageous position (e.g., a first position) to the advantageous position (e.g., a second position) for facilitating movement of the wing tip. In some examples, the aircraft control system 400 determines whether the control surface can be moved to the advantageous position (block 820). Determining whether the control surface can be moved may be based on one or more control law(s), which may indicate whether the control surface can be moved safely (e.g., without affecting the controls of the pilot needed to maneuver the aircraft 100). The control law(s) may dictate whether certain ones of the pilot command(s) 422 can be overridden or suspended. For example, if the pilot command 422 is an air brake command and the aircraft 100 is on the ground and is travelling below the trigger speed (blocks 802, 806), the air brake command may be overridden or suspended. The control surface actuator controller(s) 402 may then generate control signal(s), based on the instruction from the processor 410, for the respective control surface actuator(s) 404a-n to move the control surface (block 822) to the advantageous position. In other examples, the pilot command 422 may not be overridden or suspended. For example, if the pilot command 422 is implementing a roll command to counter a cross-wind, then it would not be safe to move the control surface. However, in cross-winds, as disclosed herein, the direction of the wind generally helps or aids in lifting the wing tips. In some examples, symmetric pilot commands may be overridden or suspended while asymmetric pilot commands may not be overridden or suspended. After the control surface 822 has been moved, the example method 800 may monitor for adverse pilot commands and determine if such commands may be overridden (block 812).

If there is another control surface that can be moved to reduce or increases the airload on the wing tip (depending on the desired movement of the wing tip), the example method 800 includes again determining a position of the control surface (block 808). For example, the aircraft control system 400 may determine a position of the leading edge slat 124 (e.g., a second control surface) and determine whether the leading edge slat 124 is in an advantageous position or a non-advantageous position for facilitating movement of the first wing tip 112. This process can be repeated for each control surface that has an effect on the airload on the wing tip. In some examples, multiple control surfaces are moved substantially simultaneously (e.g., within a few milliseconds). After the control surface(s) has/have been moved, or not, the example aircraft control system 400 moves the first wing tip 112 between the extended position and the folded position (block 824). The example method 800 may likewise be used for folding and/or unfolding the second wing tip 116 of the second wing 106. In other words, one or more control surfaces on the second wing 106 may similarly be moved prior to folding and/or unfolding the second wing tip 116.

Figure 9:
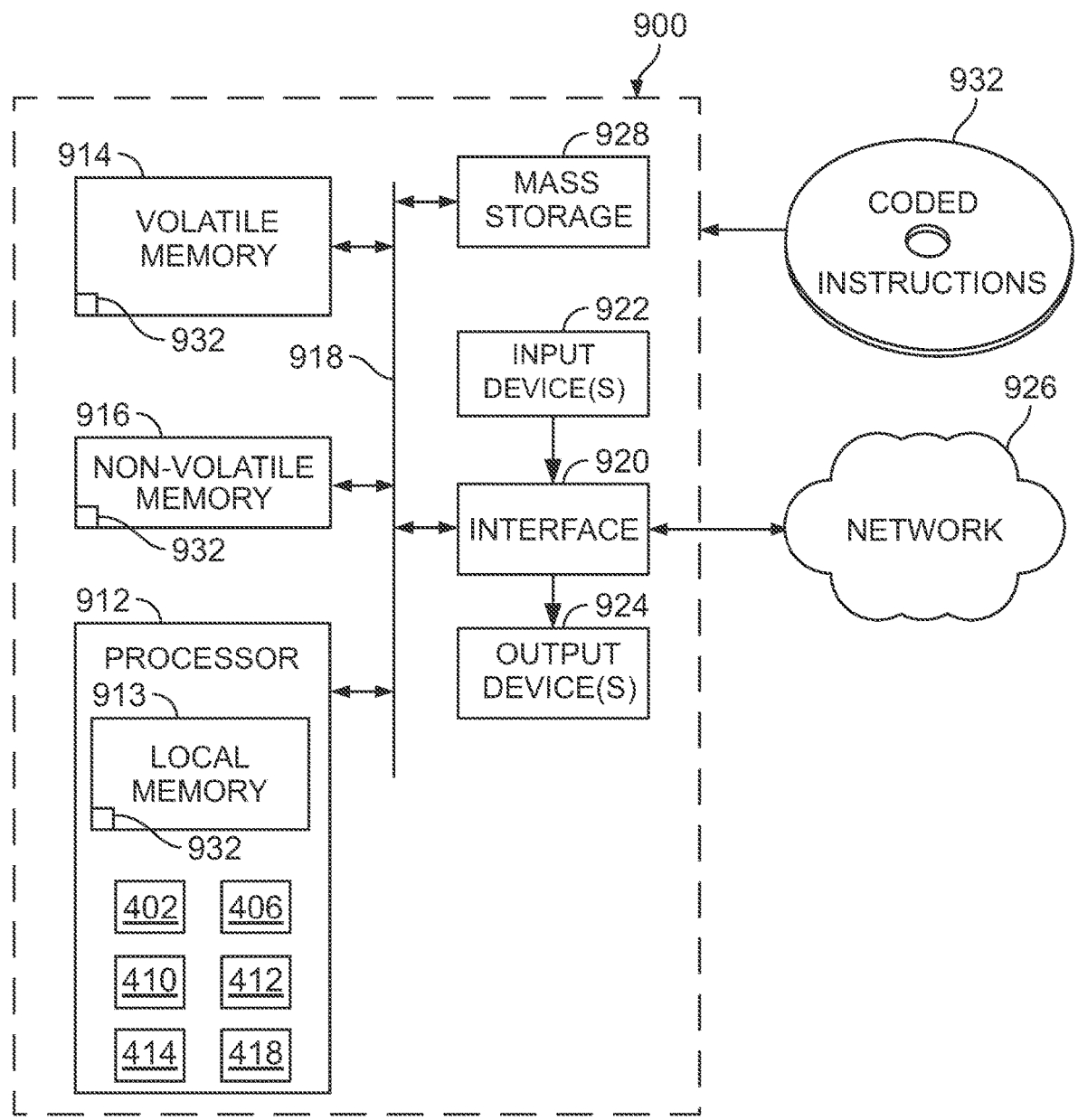
FIG. 9 is a block diagram of an example processor platform capable of executing machine readable instructions to implement at least a portion of the example method of FIG. 8.

FIG. 9 is a block diagram of an example processor platform 900 capable of executing the instructions to implement at least a portion of the method 800 of FIG. 8 and to implement the aircraft control system 400 of FIG. 4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 to implement at least a portion of the example method 800 of FIG. 8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture significantly reduce negative airloads (and, thus, the resulting forces) on a folding wing tip. As a result, the corresponding folding wing tip actuation systems can be smaller (e.g., more compact) and lighter. Therefore, the overall weight of the wings is decreased and the space needed to accommodate the actuation systems is reduced. Thus, thinner, lighter wings can be employed, which produce more efficient flight. Further, the example systems and methods disclosed herein also enable the wing tips to be folded while the aircraft is still moving. For example, the wing tips can be folded while the aircraft is leaving the runway and taxiing towards an arrival gate. As such, scheduling of the aircraft is not interrupted on account of the folding the wing tips, which may otherwise be interrupted to produce the same results.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   detecting a command from a pilot of an aircraft to maintain a control surface on a wing of the aircraft in a first position, the wing including a fixed wing portion and a wing tip moveably coupled to the fixed wing portion, the control surface moveable between the first position, which is a non-advantageous position for moving the wing tip, and a second position, which is an advantageous position for moving the wing tip;
   determining whether the command can be overridden;
   if the command can be overridden, generating an instruction to move the control surface from the first position to the second position; and
   moving the wing tip between an extended position and a folded position.

2. The method of claim 1, wherein the command is an air brake command.

3. The method of claim 2, wherein determining whether the command can be overridden is based on a speed of the aircraft.

4. The method of claim 3, further including:
   determining a speed of the aircraft; and
   comparing the speed of the aircraft to a speed threshold.

5. The method of claim 4, wherein the command can be overridden if the speed of the aircraft does not satisfy the speed threshold, and wherein the command cannot be overridden if the speed of the aircraft satisfies the speed threshold.

6. The method of claim 1, wherein determining whether the command can be overridden is based on whether the command is a symmetric command or an asymmetric command.

7. The method of claim 6, wherein the command can be overridden if the command is a symmetric command, and wherein the command cannot be overridden if the command is an asymmetric command.

8. The method of claim 1, wherein the control surface is an aileron on the fixed wing portion of the wing adjacent the wing tip.

9. The method of claim 8, wherein if the wing tip is to be moved from the extended position to the folded position, the second position of the aileron is a faired position or a trailing edge down position.

10. The method of claim 1, wherein the control surface is an aileron on the wing tip.

11. A method comprising:
    detecting a command from a pilot of an aircraft while the aircraft is not in flight, the command including an instruction to move a control surface on a wing of the aircraft from a first position to a second position, the wing including a fixed wing portion and a wing tip moveably coupled to the fixed wing portion, the control surface moveable between the first position, which is an advantageous position for moving the wing tip, and a second position, which is a non-advantageous position for moving the wing tip;
    suspending the instruction to prevent the control surface from moving to the second position; and
    moving the wing tip between an extended position and a folded position while the control surface is in the first position.

12. The method of claim 11, wherein the command is a clean-up command.

13. The method of claim 11, wherein the control surface is a leading edge slat.

14. The method of claim 13, wherein the first position is a deployed position and the second position is a stowed position.

15. A tangible machine readable storage medium comprising instructions that, when executed, cause at least one machine to at least:
    determine, while an aircraft is not in flight, a control surface on a wing of the aircraft is in a first position, the wing having a fixed wing portion and a wing tip moveably coupled to the fixed wing portion, the control surface moveable between the first position, which is a non-advantageous position for facilitating movement of the wing tip, and a second position, which is an advantageous position for facilitating movement of the wing tip;
    in response to determining the control surface is in the first position, activate a first actuator to move the control surface to the second position; and
    once the control surface is in the second position, activate a second actuator to move the wing tip between an extended position and a folded position.

16. The tangible machine readable storage medium of claim 15, wherein the control surface is an aileron on the fixed wing portion of the wing adjacent the wing tip.

17. The tangible machine readable storage medium of claim 16, wherein if the wing tip is to be moved from the extended position to the folded position, the second position is a faired position or a trailing edge down position.

18. The tangible machine readable storage medium of claim 16, wherein if the wing tip is to be moved from the folded position to the extended position, the second position is a trailing edge up position.

19. The tangible machine readable storage medium of claim 15, wherein the control surface is a first control surface, and the instructions, when executed, further cause the at least one machine to:
    determine, while the aircraft is not in flight, a second control surface on the wing is in a third position, the second control surface moveable between the third position, which is a non-advantageous position for facilitating movement of the wing tip, and a fourth position, which is an advantageous position for facilitating movement of the wing tip; and in response to determining the second control surface is in the third position, activate a third actuator to move the second control surface to the fourth position.

20. The tangible machine readable storage medium of claim 19, wherein the first control surface is an aileron and the second control surface is a leading edge slat.

* * * * *